Sept. 6, 1938.  E. P. GABBOTT ET AL  2,129,573
MANUFACTURE OF CARTONS, BARRELS, AND THE LIKE
Filed Nov. 10, 1937   7 Sheets-Sheet 1

INVENTORS: E. P. Gabbott, R. P. Peters, Walter Gunn
BY THEIR ATTORNEY:

Sept. 6, 1938.  E. P. GABBOTT ET AL  2,129,573
MANUFACTURE OF CARTONS, BARRELS, AND THE LIKE
Filed Nov. 10, 1937  7 Sheets-Sheet 2

INVENTORS
BY THEIR ATTORNEY:

Sept. 6, 1938. E. P. GABBOTT ET AL 2,129,573
MANUFACTURE OF CARTONS, BARRELS, AND THE LIKE
Filed Nov. 10, 1937 7 Sheets-Sheet 5

INVENTORS:
E. P. Gabbott.
R. J. Peters.
By Their Attorney:

Sept. 6, 1938.   E. P. GABBOTT ET AL   2,129,573
MANUFACTURE OF CARTONS, BARRELS, AND THE LIKE
Filed Nov. 10, 1937   7 Sheets-Sheet 6

INVENTORS:
E. P. Gabbott
R. P. Peters
Walter Gunow

BY THEIR ATTORNEY:

Sept. 6, 1938.  E. P. GABBOTT ET AL  2,129,573
MANUFACTURE OF CARTONS, BARRELS, AND THE LIKE
Filed Nov. 10, 1937  7 Sheets-Sheet 7

INVENTORS
E. P. Gabbott
R. P. Peters
BY THEIR ATTORNEY: Walter Swan

Patented Sept. 6, 1938

2,129,573

UNITED STATES PATENT OFFICE 2,129,573

MANUFACTURE OF CARTONS, BARRELS, AND THE LIKE

Edgar Parr Gabbott, Chorlton-cum-Hardy, Manchester, and Rupert Peter Peters, Bollington, Altrincham, England Application November 10, 1937, Serial No. 173,788
In Great Britain May 20, 1936

9 Claims. (Cl. 93—81)

The invention relates to the manufacture of cartons, barrels and the like, and more particularly to such articles of the kind in which the body part is made by winding a length of paper or the like and securing the several laps or thicknesses together by means of an adhesive.

Fully automatic machines are known for making the bodies of such cartons, barrels or the like but owing to the high initial cost of such machines large quantites are still made by a slower process of winding onto a mandrel involving the services of at least two operatives.

The object of the invention is a simple and improved method of and means for producing such bodies.

The invention consists in the method of making wound bodies for cartons, barrels and the like, wherein the paper, or other material is fed to a mandrel which while stationary or substantially stationary, grips the ends of the paper, then revolves to wind the same in a predetermined number of turns or laps, an adhesive being applied to the paper as it is fed to or while on the mandrel and the paper being severed to the required length, the mandrel being further rotated to secure the outer end of the paper and the body being finally removed from the mandrel by stopping the rotation of the mandrel and causing it to collapse in diameter and at the same time to release the inner end of the paper.

Apparatus for carrying out the method according to the invention comprises improved details of construction of the mandrel, of mechanism for applying the adhesive or releasing and removing the finished body and of timing each stage of the cycle of operations.

In the accompanying drawings:—

As illustrated, there is a main frame carrying a fixed shaft 11 having a long overhang on which shaft the mandrel described in detail later is rotatably mounted, the purpose of the overhang being to leave one end of the mandrel free for the subsequent removal of the finished body. At the base of this shaft is provided a driving flange 12 to which the mandrel is bolted, which flange is rotatably mounted on suitable ball bearings and embodies a toothed flange 13 for chain drive and a hollow drum 14 which internally forms a brake drum. At its outer end, the shaft 11 carries another ball bearing 15 on which the other end of the mandrel is supported.

Figure 8:
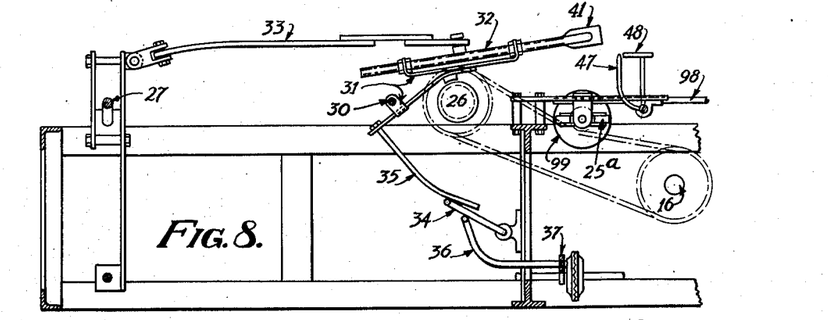
Fig. 8 is a side view of the crosshead and striker mechanism for operating the valve tappets.
Figure 9:
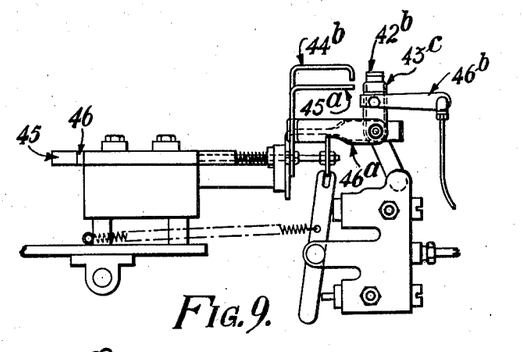
Figs. 9 and 10 are side and plan views of the valve and tappet mechanism.
Figure 10:
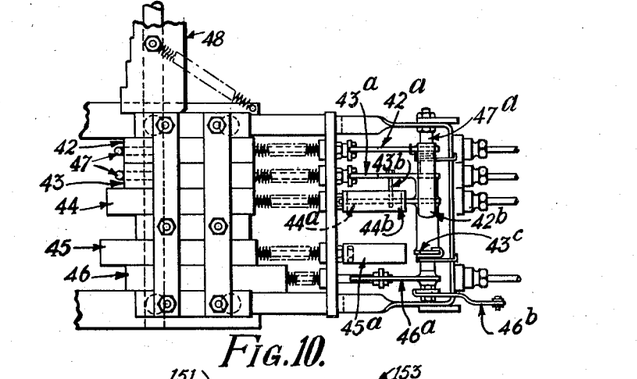

The main frame 10 comprises two transverse members and three longitudinal members, which latter are indicated as 10a, 10b and 10c. The mandrel, table and working part of the machine are arranged between 10a and 10b while the driving and timing mechanisms are mainly at one side of the machine between the members 10b and 10c. The members 10b and 10c carry brackets 10d in which the fixed shaft 11 is supported and secured. Below the shaft 11 is mounted a driving shaft 16 carrying a clutch 17, one part of which is secured to the shaft while the other part is provided with a further chain wheel 19 adapted to be coupled by a chain to the toothed flange 13 of the mandrel. In front of the driving shaft 16 is a counter-shaft 20, mounted in suitable bearings on the members 10b and 10c, which shaft is provided with fast and loose pulleys 21 and a chain wheel 22, which latter is coupled by a driving chain to the chain wheel 18 of the clutch. Instead of providing fast and loose pulleys for belt drive from a power shaft an electric motor may be mounted on the frame with positive drive to the counter-shaft. Fixed to the counter-shaft 20 is also a chain wheel 23 which is connected by a driving chain to a hydraulic pump 24. Fixed to the driving shaft 16 is a timing chain wheel 25 coupled by chain to a single start timing worm 26 rotatably mounted on the counter-shaft 20 which timing worm 26 is connected by a further chain to a crank-shaft 27 mounted in further brackets at the front end of the members 10b and 10c. The timing shaft, crankshaft, driving shaft and mandrel rotate at the same speed in the same direction. Engaging and driven by the chain between the driving shaft and timing worm is a governor 25a. Adjacent to the pump 24 is a tank 28 for the hydraulic fluid and a hydraulic pressure accumulator 29. Immediately in front of the countershaft 20 is a fixed guide bar 30 on which is slidably mounted a compound cross head 31 having on its underside a lug normally in mesh with the threads of the worm 26 (see Figs. 3a and 8). Slidably mounted in the crosshead is a shaft 32 which is connected to the crank of the crankshaft 27 by a connecting rod 33 of adjustable length. The crosshead 31 is adapted to be rocked about the guide bar 30 so that its lug may be disengaged from the worm and this movement is obtainable for any position of the crosshead on its guide bar by means of a rocking bar 34 adapted on the one hand to engage a rod 35 depending from the crosshead and itself to be rocked by an arm 36 secured to the clutch control arm 37. The clutch control arm 37 is secured to the end of a shaft carrying the clutch control fork 38, and is operated by a hydraulic ram 37a, the control valve of which are operated by a tappet 46 described later. On the other end of the clutch fork shaft is an arm 14e connected by a suitable link 14b including a cushion spring 14d (shown in Fig. 7), to the brake cam lever 14c, operating the brake shoes within the brake drum 14, to apply such shoes simultaneously with disengagement of the clutch. The crosshead 31 is connected by a wire cable 31a to a counterweight 39 which acts to return the crosshead to the starting end of its guide bar when its lug has been lifted out of the threads of the worm.

An adjustable stop 40 with cushion spring is provided on the guide bar 30 which latter is calibrated for setting the number of turns of the mandrel. On the end of the crosshead shaft 32 is a striker head 41 which is adapted to operate a group of 5 tappets 42, 43, 44, 45 and 46, which except for 45 operate hydraulic valves arranged in pairs of inlet and outlet, all of which mechanism is mounted on brackets above the clutch. The tappet 45 merely operates a catch described later. The valves of each pair are operated by a rocker having a spring at one end of sufficient strength to pull the rocker and hold the outer valve normally open. The ends of the rockers are adapted to be engaged by the tappets which push back the rockers, the first part of their movement closing the outlet valve and then following on to opening the inlet valve. The valves controlled by the tappets 42 and 43 are arranged for simultaneous operation by fingers 47 attached to a shaft carrying a striker plate 48, the edge of which is stepped and radiused to correspond with stroke of the striker in its different positions due to the radial movement of the connecting rod. The striker engages directly with the ends of the tappets 44, 45 and 46 and it is to be noted that the spacing of these tappets is the same as the pitch of the worm, with a blank between 44 and 45. The tappets of all the valves have return springs while tappets 42, 43, 44 and 46 have catches 42a, 43a, 44a and 46a respectively pivotally mounted on a fixed rod 47a. The tappet 44 carries an arm 44b adapted to engage a trip arm 42b on the catch 42a. The catch 43a has a trip stud 43b adapted to engage beneath and trip the catch 44a and also has a trip arm 43c adapted to be engaged by an arm 45a on the tappet 45. The catch 46a is adapted to be tripped by an arm 46b having a wire cable, the other end of which is connected to a trip pawl 88 described later and operated with the return movement of the feeding table.

The feeding table comprises a carriage 50 mounted within an adjustable table which comprises side members 51 and 52 supported on and secured to cross members 53, on the underside of which are front and rear brackets 54 and 55 carried on a pair of feed screws 56 which in turn are supported in brackets 57 on transverse frame members 58 arranged between the main frame members 10a and 10b, previously described. The front brackets 54 are screw-threaded to engage the threaded portions 59 of the feed screws which are arranged to be rotated together by means of a shaft 60 and pairs of skew pinions 61. This arrangement enables the table to be moved towards or away from the mandrel so that different diameters of mandrel may be used. At the mandrel edge of the table is a glue trough 62 in which is mounted a glue roller 63 connected by suitable driving means to an electric motor 64. Across the top of the glue roller is a scraper knife 65 to provide the required thin film to be applied to the paper. Across the table in front of the glue trough is an angle iron 62a which forms a rest for the overhanging end of the top plate 74 of the adjustable feeding table, described later. At the front end of the adjustable table is a roller 66 to hold a loop of the paper. A guillotine knife 67 is mounted across the table, the end arms of the knife being pivoted on the inside of brackets 68 fixed on top of the side members 51 and 52. Also pivoted to the brackets 68 and on the outside thereof are lever arms 69 carrying a presser bar 70 which is adapted to be lowered onto the paper to cause the latter to engage the top of the gum roller. Mounted on the side member 52 is a hydraulic ram 70a and with return spring 70b, the position of which ram is connected to the end of one arm 70d of the guillotine. Also connected to another arm 70e of the guillotine is a compression spring 70c which is arranged so that the end thereof connected to the said arm 70e moves over a dead centre position during operation of the guillotine thus imparting a snap action to the latter.

The carriage 50 of the feeding table comprises longitudinal members 50a and 50b connected together by a wooden beam 71, angle iron 71a and tire rod 71b. Between the beam 71 and angle iron 71a is a trough 72 in which are mounted two shafts carrying a pair of cutter discs 73. Sheet metal plates 74 and 75, secured to the longitudinal members, form the top of the carriage on which the paper rests, the plate 74 overhanging beyond the beam 71 and the ends of the longitudinal members. Hinged above the plate 74 is a top plate 76 the transverse edge of which is level with the transverse edge of the plate 74 and forms a nip and guide for the paper. Behind the trough is a cross bar 77 carrying a plurality of inclined spring loaded grippers 78 which rest on the paper.

Below the adjustable table is a stirrup 79 connecting the ends of the lever arms 69, which stirrup is weighted and connected to the piston of a hydraulic ram 80.

Figure 11:
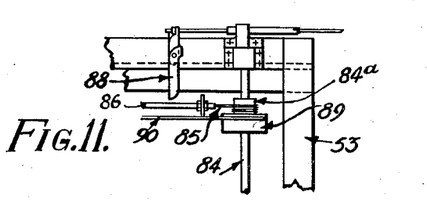
Fig. 11 is an inverted plan showing a trip catch connected by cable to a part of the valve control mechanism.

Secured to the front cross member 53 are a pair of pulleys 81 over which pass cables 82 carrying weights 83 and anchored at their other ends to the beam 71. A shaft 84 is mounted between the members 51 and 52 and anchored on a small pulley 84a is a cable 85 connected to the piston rod 86 of a hydraulic ram 87. On the rod 86 is a collar 86a which is provided to engage a trip pawl 88 (see Fig. 11) connected by cable to the arm 46b of the catch 46a. On the shaft 84 are two larger pulleys 89 to which are attached and on which are wound cables 90 connected at their free ends to the tie bar 71 lb.

The mandrel itself is a hollow cylinder and is collapsible. It consists of three parts, one a semi-circular part 91, another a nearly semi-circular part 92, hinged together longitudinally and a third and narrow part 93, hinged to the free edge of the semi-circular part and overlying the edge of the other part 92 and adapted to be moved outwards when the two main parts have hinged upwards. The underlap 92a of the main part 92 is bent to form a support for the overlap of the smaller part when the mandrel is expanded to its cylindrical form. Within the cylinder is a shaft 94 mounted on the larger part 91 and carrying several levers 95 arranged along the length of the mandrel and engaging cam faces formed on the edge of the partitions 96 forming part of the built-up structure of the part 92. Return springs 95a are attached to the levers 95. The hinged joint of the two major parts of the cylinders are constructed to form a jaw 97 to receive and grip the end of the paper, for which purpose a rubber or leather insert may be provided so that various thickness of paper can be used.

Figures 6, 6A, 7:
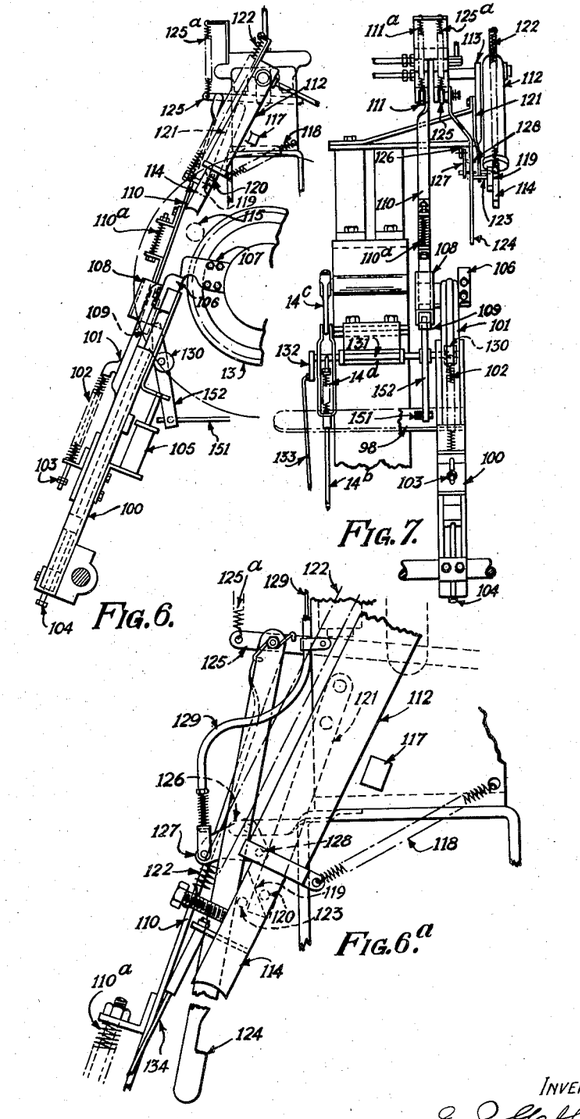
Figs. 6 and 7 are enlarged detail side and rear views of part of the operating mechanism associated with the mandrel.
Fig. 6a is an enlarged view of partly hidden mechanism shown in Fig. 6.

As some of the operations, such as the feeding in of the paper at the start, require that the mandrel shall be stationary or nearly so, the centrifugal governor 25a is provided, geared to the mandrel driving shaft as previously described, such unit controlling the movement of certain controlling mechanism. The centrifugal control mechanism associated with the governor comprises a cranked arm 98 adapted to rest on the periphery of a wheel 99 when the latter is rotating, the wheel moving axially by the operation of the governor weights when the speed of revolution falls to a predtermined limit, allowing the arm to fall down behind the wheel. This arm 98 is secured to a mandrel stop lever 100 which is thus held back until the mandrel has slowed down. This lever 100 is shown in Figs. 6 and 7, and has a sliding extension 101, loaded by a compression spring 102 with adjustable extension stop 103. Incorporated in the lever is also an adjustable stop 104 and a dash pot 105.

Figure 4:
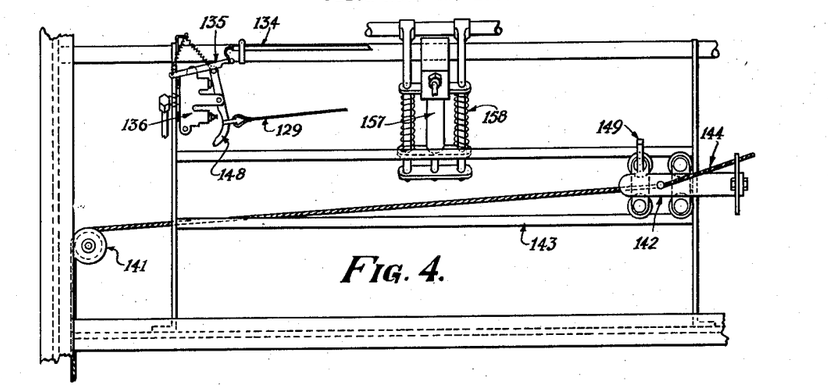
Fig. 4 is a part plan showing the mechanism below the mandrel.

The upper end of the lever extension 101 has a nose 106 adapted to engage a projecting lug 107 secured to the mandrel driving chain wheel 13, previously described. Also attached to the upper end of the lever extension 101 is a catch box 108 in which is slidably mounted the catch end 109 of a catch link 110, such catch end being slidable on its link against a cushion spring 110a. The end of the link 110 is connected to a lever 111 of a valve controlling a hydraulic ram cylinder 112, which is pivotally mounted on a bracket 113 above the driving flange of the mandrel. The end of the ram plunger 114 is shaped to engage a stud 115 (see also Fig. 5) carried by an arm 116 secured to the shaft 94 within the mandrel. Behind the ram cylinder 112 is a stop 117 and a spring 118 but when the ram piston is withdrawn as shown in Fig. 6 a cam 119 on the plunger 114 engages a pin 120 on a fixed arm 121 and holds the ram end clear of the path of rotation of the stud 115 against the action of the spring 118. The ram plunger has a return spring 122 and a laterally projecting pin 123, adapted to engage the catch end 124 of a link connected to a lever 125 of a valve which controls the ejector ram 137 described later. The valve levers 111 and 125 have return springs 111a and 125a. A small bracket 126 carried a trip member 127 having a pin 128 adapted to withdraw the catch end 124 from engagement with the pin 123. This trip member is connected by a wire cable 129 (see Fig. 4) to a lever described later and operated by the ejector when it reaches the end of its travel. Behind the lever 100 is a cam 130 adapted to withdraw the lever for disengaging the nose 106 from the lug 107, which cam is mounted on a shaft 131 having at its other end an arm 132 connected by link 133 to the brake operating link 14b which, as described earlier, is connected to the shaft on which the clutch control fork, 38 is mounted. Attached to the plunger 114 of the ram is a wire cable 134 connected to a catch 135 controlling the valve 136 for the table operating ram 87.

The ejector mechanism comprises a hydraulic ram 137 (see Fig. 1) connected by cable 138 to a compound pulley 139, to the larger diameter of which is attached a cable 140, which cable passes over a suitable guide pulley 141 and attaches to an ejector slide 142 mounted on rollers running on rods 143 below the mandrel. Another end of the cable 144 returns over a similar guide and is attached to a compound pulley 139a similar to 139, the smaller diameter part of which is connected by a cable 145 to a return spring 146. The ejector slide has a raised plate 147 having a curved upper edge adapted to lie just clear of the mandrel surface and engage the edge of the carbon wound thereon. The lever of the valve 136, which is connected to the cable 129 as already described, has an extension 148 adapted to be engaged by a projection 149 on the ejector slide.

Figure 12:
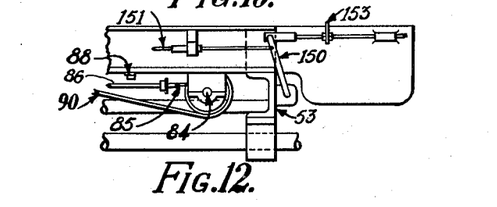
Fig. 12 is a detail view of part of the mechanism below the table.

Underneath the table and secured to the frame member 53 is a pivoted lever 150 (see Fig. 12) connected by wire cable 151 to a trip lever 152 (see Figs. 6 and 7) pivoted on the shaft 131 and having its end behind the catch end 109. The lever 150 has an adjustable projection 153 adapted to be engaged by the edge of the plate 74 of the carriage 50 of the feeding table.

The valves and their respective rams are connected by suitable pipes to each other and to accumulator 29 and reservoir 28.

Figure 1:
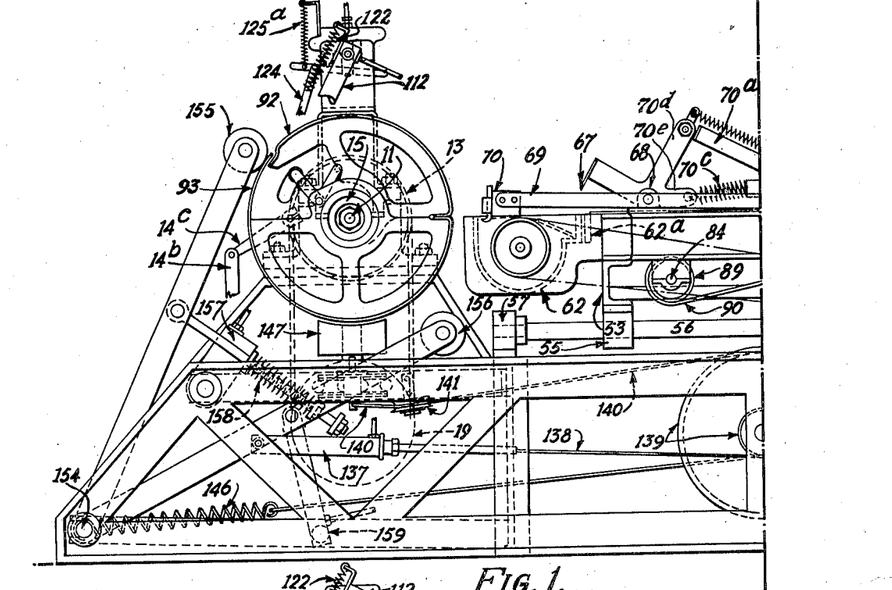
Figs. 1 and 1a are together a side elevation of one example of a machine made in accordance with the invention.
Figure 1A:
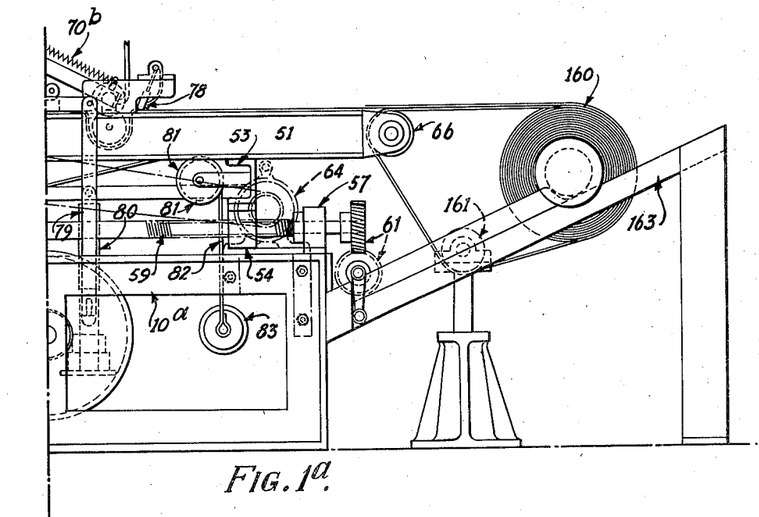
Figure 2:
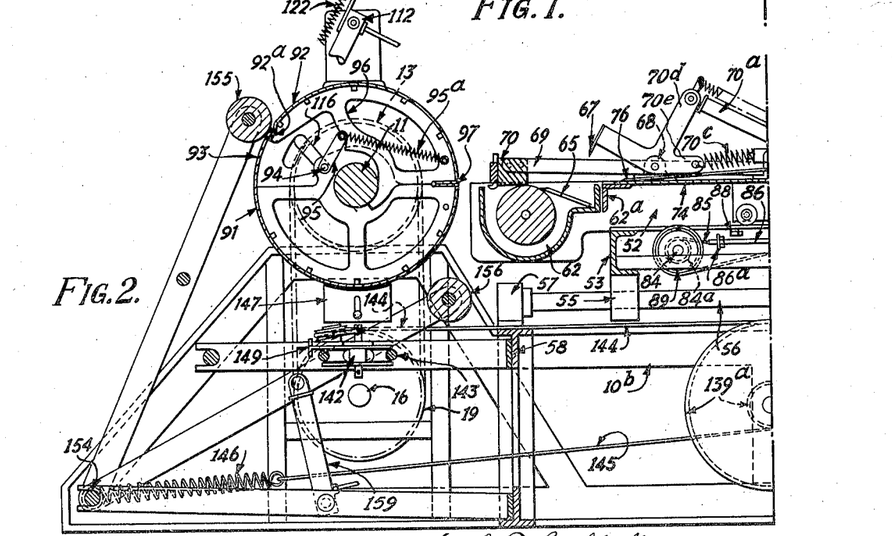
Figs. 2 and 2a are together a sectional side elevation.
Figure 2A:
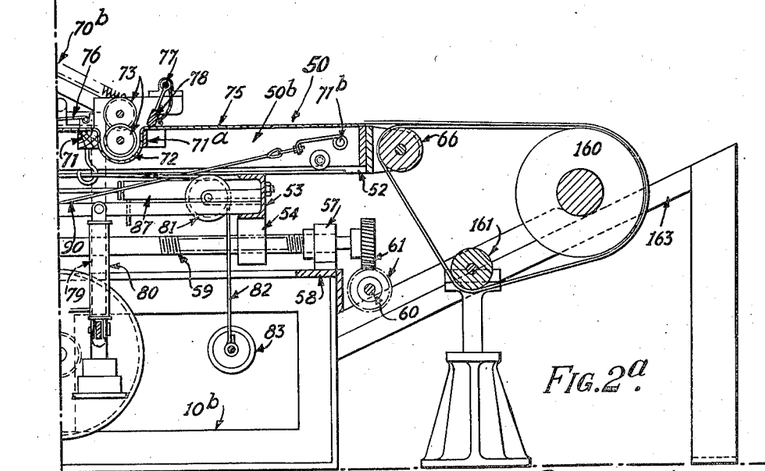

At the back of the machine and between the members 10a and 10b of the frame is a tie bar 154 on which are pivoted pairs of levers carrying felt-covered pressure rollers 155 and 156 adapted to engage the mandrel and to hold the paper down thereon as it winds on. The pressure rollers 155 is operated by a hydraulic ram 157 having return springs 158 and the pressure roller 156 is operated by a hydraulic ram 159 and returns by its own weight. The roll of paper 160 is shown in Figs. 1 and 2 looped round the roller 66 already described, and a further roller 161. The roll of paper is mounted on an axle having flanged ends which rests on the edges of inclined tracks 163 secured to the main frame. Instead of the cutter knives 73, blade knives may be fastened to the bar 70 so as to project downwardly against the paper and sever it as it passes underneath the bar.

The valve controlled by the tappet 42 controls the ram 80 which operates the presser bar 79. The valve controlled by the tappet 43 controls the two rams 157 and 159 which operate the pressure rollers 155 and 156. The valve controlled by the tappet 44 controls the ram 70a which operates the guillotine knife 67 and also through the arm 44b pushes back the trip arm 42b lifting the catch 42a and releasing the valve controlled by the tappet 42. The tappet 45 through its arm 45a operates the trip arm 43c to lift the catch 43a which releases the valve previously operated by the tappet 43 and at the same time, through the trip stud 43b it also lifts the catch 44a and releases the valve previously operated by the tappet 44. The valve operated by the tappet 46 controls the ram 37a which operates the clutch control forks 38 and through the link 14b simultaneously operates the brake arm 14c.

Figure 5:
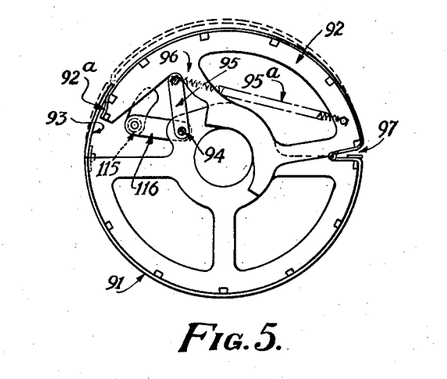
Fig. 5 is a sectional end view of the mandrel in the collapsed position.

In operation, it must be assumed that the mandrel is in the collapsed position so that its hinged jaw 97 is open as shown in Fig. 5. The edge of the paper is projecting beyond the edge of the plate 74 where it has or would have been cut by the guillotine knife 67, the carriage 50 being in the position shown in Figs. 1 and 2. The lug 107 of the mandrel chain wheel is in engagement with the nose 106 and has depressed the extension 101 of the lever 100 to its lowest position where its end is in engagement with the adjustable stop 104, by which latter the position of the mandrel can be adjusted so that the jaws 97 of the mandrel are on the correct level to receive the paper. The drag of the clutch checked by the brake holds the mandrel in this position. The mandrel is held collapsed by reason of the catch end 109 having been pulled down with its catch box which is fixed to the part 101, thus holding down the valve lever 111 which admits pressure fluid to the ram 112. The crosshead 31 will be in the position shown in Fig. 3a, but with its lug lifted clear of the feed screw 26 by the clutch lever 37.

The cycle of operation starts by the operation of the valve 136 to admit pressure fluid to the ram 87 causing the table 50 to come forward until the bar 71 reaches the angle iron 62a. The edge of the paper projecting beyond the plate 74 will have entered the jaws 97 of the mandrel. At the end of such movement the end plate 74 of the table 50 strikes the projection 153 which through the cable 151 lifts the catch end 109 through the lever 152 allowing it to rise to the position shown in Fig. 6. This allows the valve lever 111 to rise operating the valve to exhaust the pressure from the ram 112. The mandrel is then closed by the action of its spring 95a to grip the paper. The piston of the ram 112 through the cable 134 has pulled back the catch 135 to release the lever of the valve 136 which then allows the table to return by its weight 83. As the table 50 reaches the end of its return movement the trip pawl 88 is engaged by the collar 86a which is connected by cable to the arm 46b. The trip pawl pulls the arm 46b and lifts the catch piece 46a which releases the valve operated by the tappet 46 controlling the ram 37a to engage the clutch and release the brake simultaneously. At the same time the cam 130 is rotated by the lever 132 connected to the brake link 14b and pulls the nose 106 from under the lug 107. At the same time also the lug of the crosshead 31 is lowered into the thread of the feed screw 26.

Figure 3:
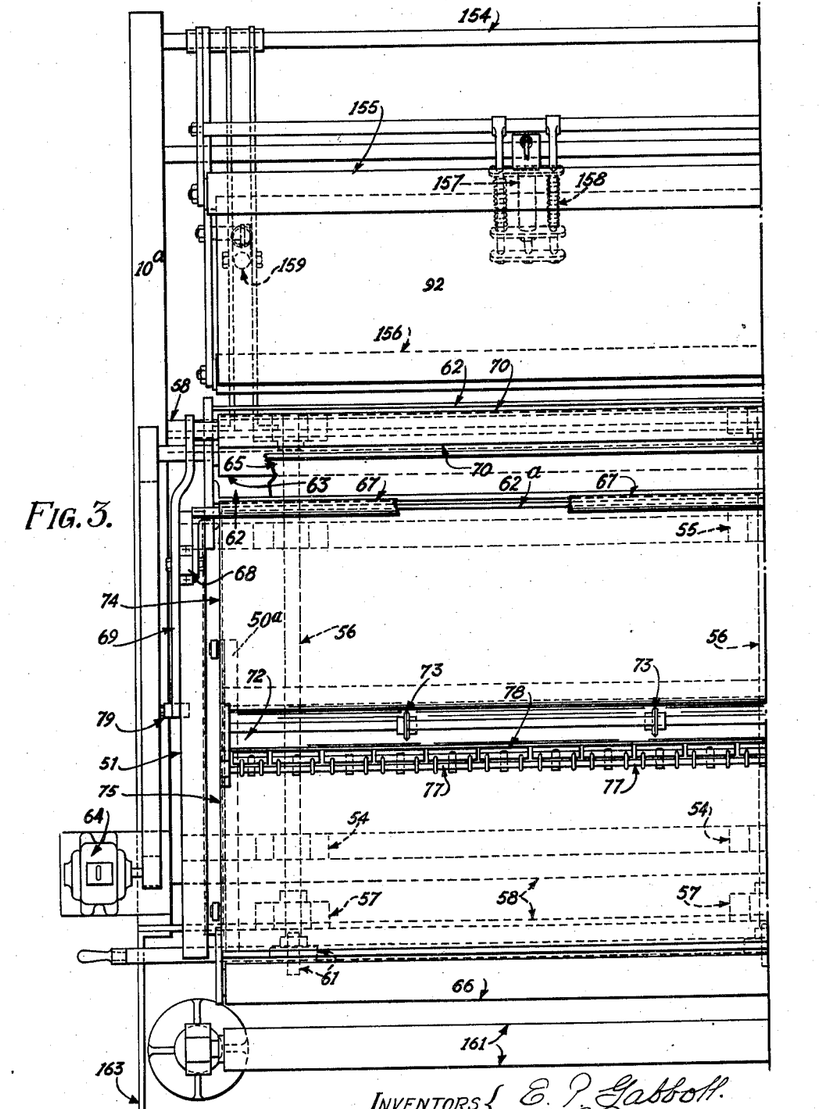
Figs. 3 and 3a are together a plan.
Figure 3A:
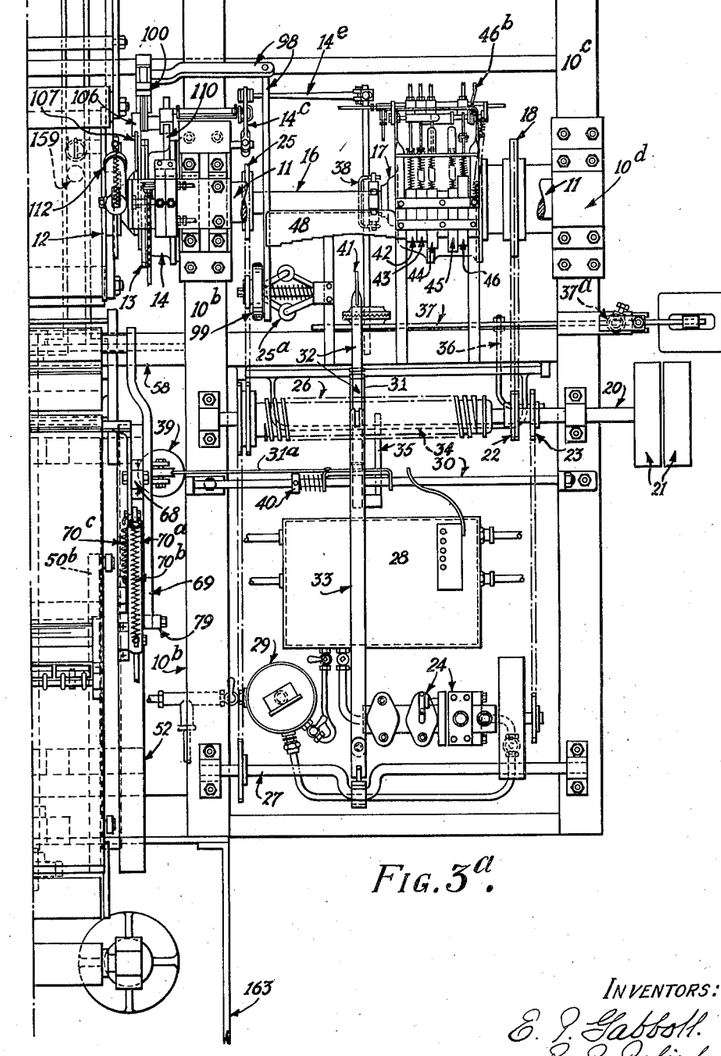

The mandrel now commences to revolve, winding the paper onto itself while the crank commences a forward stroke of the rod 32, the striker head 41 of which soon engages the striker plate 48 which through the fingers 47 pushes back the tappets 42 and 43. The valves operated by these tappets respectively cause the presser bar 70 to descend and the pressure rollers 155 and 156 to press against the mandrel. The paper is thus brought down by the bar 70 onto the gum roller, which is continuously driven and gumming of the underside of the paper commences. This delay allows for the first turn of the paper which forms the inside of the carton not to be gummed. The mandrel continues to revolve and the striker head reciprocates while being also moved along by its feed screw 26, but apart from making contact with the steps of the plate 48 it does nothing until it reaches the tappet 44. When it engages the tappet 44 it operates the valve which controls the guillotine ram 70a, which comes down with a snap action and severs the paper while the latter is still taut. At the same time, the tappet 44, through 44b and 42b lifts the catch 42a and releases the valve allowing the presser bar to rise. The mandrel makes a further complete rotation to wind and roll on the end of the paper while the striker head passes the space between the tappets 44 and 45. Then the striker head 41 engages and operates the tapper 45 which through its arm 45a and trip arm 43c lifts the catch 43a and through 43b, also lifts the catch 44a thus allowing the guillotine knife to rise and the pressure rollers 155 and 156 to lift off the mandrel. The striker head next engages the tappet 46 which operates the valve for the ram 37a. This ram lifts the lug of the crosshead 31 out of the thread of the feed screw and the crosshead is then pulled back by its weight 39 to the starting position as shown in Fig. 3. At the same time, the clutch is eased and the brake applied and the cam 130 is rotated so that the lever 100 can move into position for the nose 106 to be engaged by the lug 107. However, the lever 100 is not allowed to move into such position until the mandrel has slowed down sufficiently for the wheel 99 of the governor to be drawn from under the lever 98 fixed to the lever 100. The clutch is set to drag the drum round slowly against the brake and when the lug 107 engages the nose 106 it pushed down the extension 101 until the stop lever 100 reaches the stop 104, the dash pot 105 acting to check this movement. The downward movement of the extension 101 also pulls down the catch end 109 which it had picked up when it was released with the starting of the mandrel. The catch end 109 through the link 110 pulls down the lever 111 of the valve admitting pressure to the ram 112, the plunger 114 of which engages with the stud 115 and operates the levers 95 to collapse the mandrel. The downward movement of the plunger 114 also through the pin 123 engaging the catch end 124, operates the lever 125 of the valve which then admits pressure to the ejector ram 137. The plate 147 engages the end of the carton which is now hanging loose on the mandrel and pushes it off the end of the mandrel. At the end of such movement of the ejector lug 149 engages the lever 148 to operate the valve 136 and restart the cycle of operation. The hydraulic pump is of course in operation the whole time to maintain the pressure.

The mechanism could be operated by electric solenoids instead of hydraulic rams and the valves would then be replaced by electric contact switches.

What we claim is:

1. A power driven machine operating in a repeating cycle, for winding paper into tubes for barrels, cartons or the like comprising a collapsible mandrel having gripping means to receive and grip the end of the paper, a feed table for the paper slidable towards and away from said mandrel, ejector means associated with said mandrel means controlled by said ejector means at the outward end of its movement, to cause motion of said feed table towards the mandrel, means controlled by the feed table when it reaches the end of its feed stroke for causing the mandrel to expand and grip the end of the paper fed by the feed table, further means controlled by said feed table to impart a rotary movement to the mandrel, return means for the feed table and ejector, after their operation; means for severing the paper to the required length, during winding, means for applying adhesive to the paper during winding, means for arresting rotation of the mandrel and locating the same in a predetermined position with its jaws opposite the feed table, means for then effecting collapse of the mandrel and opening of the jaws, controlled by the means for locating the mandrel, and means for operating the ejector controlled by collapse of the mandrel.

2. A machine for winding paper into tubes for barrels, cartons or the like from a web of paper comprising a collapsible mandrel with two segments connected by a hinge formed as jaws to receive and grip the end of the paper, means for feeding the end of said paper web to said mandrel jaws, means operable by said paper feeding means for expanding the mandrel whereby the hinged jaws of the latter grip the paper, a driving shaft, means also operable by said paper feeding means for clutching said mandrel to said driving shaft, means for applying adhesive to said paper web, means for severing said paper web, control means operable to control the application of adhesive and to control the severing means, said control means being actuated during rotation of said mandrel, and means for ejecting the wound paper from said mandrel.

3. A machine for winding paper into tubes for barrels, cartons or the like from a web of paper, comprising a collapsible mandrel with two segments connected by a hinge formed as jaws to receive and grip the end of the paper, means for feeding said paper to said mandrel, means operable by said paper feeding means for expanding the mandrel whereby the hinged jaws of the latter grip the paper, a driving shaft, means also operable by said paper feeding means for clutching said mandrel to said driving shaft, means for applying adhesive to said paper web, means for severing said paper web, hydraulic control means operable to control the application of adhesive and to control the severing means comprising a plurality of valves, tappets for actuating said valves, a striker adapted to actuate said tappets in succession, and means driven from the driving shaft to operate said striker for motion in two directions, during rotation of the mandrel.

4. A machine for winding paper into tubes for barrels, cartons or the like from a web of paper comprising a collapsible mandrel with two segments connected by a hinge formed as jaws to receive and grip the end of the paper, means for feeding said paper to said mandrel, means operable by said paper feeding means for expanding the mandrel whereby the hinged jaws of the latter grip the paper, a driving shaft, means also operable by said paper feeding means for clutching said mandrel to said driving shaft, means for applying adhesive to said paper web, means for severing said paper web, control means operable to control the application of adhesive and to control the severing means, said control means being actuated during rotation of said mandrel, means for arresting rotation of the mandrel and collapsing the same, means for ejecting the wound paper from said mandrel and means operable by said ejector means to actuate said paper feeding means.

5. A machine for winding paper into tubes for barrels, cartons or the like from a web of paper comprising an expansible and collapsible mandrel having gripping means for the end of the web of paper, a feeding table slidable towards and away from said mandrel for feeding the end of said web of paper to said gripping means and means controlled by the forward movement of said feeding table to cause said gripping means to grip the end of the web of paper.

6. A machine according to claim 5 wherein completion of the forward movement of the feeding table also causes the expansion of the mandrel.

7. A machine for winding paper into tubes for barrels, cartons or the like from a web of paper comprising an expansible and collapsible mandrel, gripping means on said mandrel for the end of the web of paper, means for feeding said paper to said mandrel, drive means including a control clutch for rotating the mandrel to wind the paper thereon, fluid pressure means for applying adhesive to the paper during winding, fluid pressure means for severing the paper during winding, fluid pressure means for operating the control clutch, a series of tappet operated fluid pressure control valves, a reciprocating striker for operating the tappets and means for traversing the striker so that it engages the tappets in sequence as it reciprocates.

8. A machine according to claim 7, characterized by means for adjusting the number of turns of paper to be applied to the mandrel comprising means for varying the starting point of the traverse of the striker and an arcuate tappet for the control valve of the adhesive applying device adapted to be engaged and operated by the striker on the first reciprocation thereof.

9. A machine for winding paper into tubes, barrels, cartons or the like comprising a collapsible and expansible mandrel formed with two hingedly connected major segments provided with supporting webs on their inner sides, one of which segments is semicircular and the other nearly semicircular, the hinge being constructed to form jaws to receive and grip the end of the paper and a small third segment hinged at one edge to the said semicircular major segment and slidably supported at its other edge on the free edge of the other major segment and cam-actuated means engaging said supporting webs for moving the major segments relatively about their hinged connection to collapse or expand the mandrel.

EDGAR PARR GABBOTT.
RUPERT PETER PETERS.